Nov. 17, 1964  T. A. DAVIS  3,157,433

SAFETY LOCK FOR PIVOTED SEAT BACKS

Filed Oct. 15, 1962

Thomas A. Davis
INVENTOR.

BY Oliver D. Olson
Agent

United States Patent Office 3,157,433
Patented Nov. 17, 1964

3,157,433
SAFETY LOCK FOR PIVOTED SEAT BACKS
Thomas A. Davis, 1735 SW. Prospect Drive,
Portland, Oreg.
Filed Oct. 15, 1962, Ser. No. 230,342
5 Claims. (Cl. 297—379)

This invention relates to pivoted seat backs of the type found in automobiles and the like, and more particularly to a safety lock by which to releasably secure such seat backs against pivoting.

From the standpoint of safety, it is a matter of considerable concern that the pivoted seat backs generally employed on the front seat of two door sedans, are free to swing forward during rapid deceleration of the automobile which occurs, for example, during rapid braking or upon collision. The protection afforded a rear seat passenger by the rigid front seat back of a four door sedan thus is not available, and the rear seat passenger may be catapulted into the dash board or windshield, over the collapsed front seat back. If the front seat is occupied, the additional weight of the front seat back, and perhaps the weight of a rear seat passenger, can thrust the front seat passenger forward and inflict serious injury.

Many locking devices have been proposed heretofore with the view toward eliminating the foregoing hazards. However, they have not been completely satisfactory, primarily because of complicated and costly construction and installation.

Accordingly, it is the principal object of the present invention to provide a safety lock for pivoted seat backs, which lock is of extremely simplified construction for economical manufacture, is readily adaptable for use with all types of pivoted seat backs, and is of rugged construction for long operating life with a minimum of maintenance.

The foregoing and other objects and advantages of this invention will appear from the following detailed description, taken in connection with the accompanying drawing in which.

Figure 1:
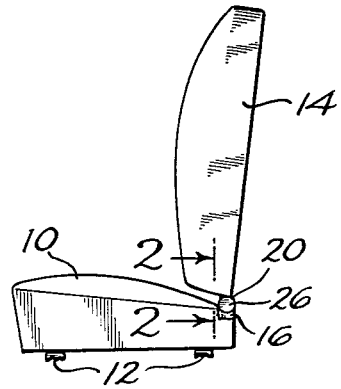
FIG. 1 is a side elevation of a seat and pivoted seat back assembly incorporating a safety lock embodying features of the present invention.

In FIG. 1 the seat 10 is mounted securely upon a vehicle body by such means as the mounting brackets 12. The seat may extend the full width of the vehicle, as in the case of a conventional two door sedan, or it may be of the presently popular "bucket type which accommodates a single passenger. In either case a pair of seat backs are disposed side by side and mounted independently of each other by means of separate pivots. Each half of the full width seat thus is provided with its own independent seat back, much in the same manner as each bucket seat is provided with its own seat back.

Figure 2:
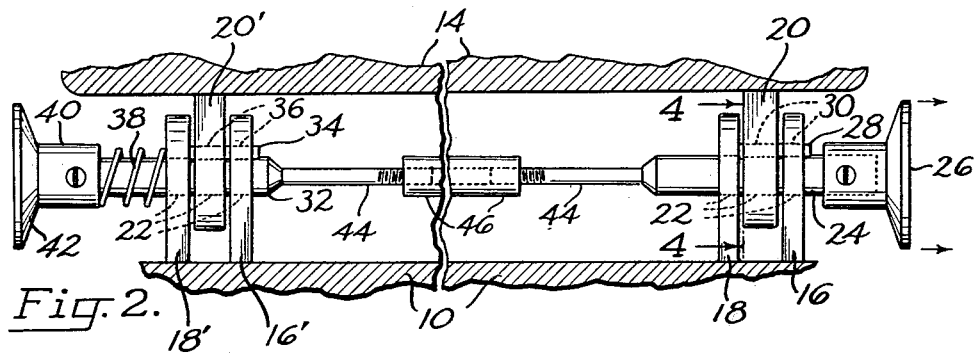
FIG. 2 is a fragmentary foreshortened sectional view taken along the line 2—2 in FIG. 1 and showing details of construction and arrangement of parts of the safety lock in the locking position.
Figure 3:
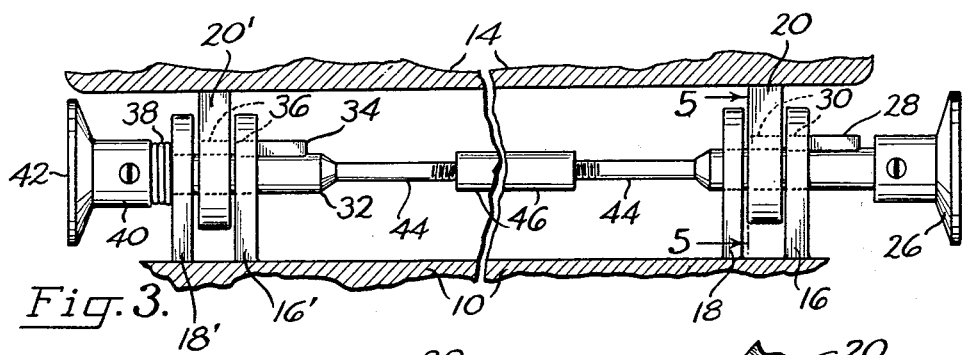
FIG. 3 is a fragmentary foreshortened sectional view, similar to FIG. 2, showing the safety lock in the release position.
Figure 4:
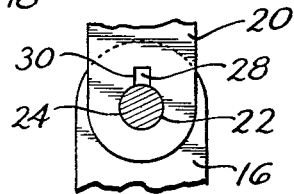
FIG. 4 is a fragmentary sectional view taken along the line 4—4 in FIG. 2.

A conventional pivot mounting for a seat back 14 is illustrated in FIGS. 2 and 3. Laterally spaced pairs of brackets 16, 18 and 16', 18' project upward from the seat 10 adjacent the lateral ends of the rear side thereof, and the brackets of each pair receive freely between them the downwardly projecting cooperating bracket 20, 20' on the underside of the associated seat back 14. The cooperating brackets are provided with axially registering openings 22 for the reception of a conventional pivot bolt (not shown).

In accordance with the present invention, the conventional pivot bolts are replaced by the locking mechanism now to be described. One of the pivot bolts is replaced by a shaft 24 which extends freely through the aligned openings 22 and the outer end of the shaft is provided with a hand knob 26 by which to manipulate it, as described in detail hereinafter. The shaft is provided intermediate its ends with a radially projecting elongated key 28. The outer seat bracket 16 of the pair and the adjacent back bracket 20 are provided with keyways 30 communicating with their respective openings 22 and positioned so that they are in alignment when the seat back is in erect position. These keyways are proportioned to freely receive the key. The inner seat bracket 18 preferably is not provided with a similar keyway.

The inner conventional pivot bolt (not shown) is replaced by a shaft 32 which extends freely through the aligned openings 22 in the brackets 16', 18', 20'. This shaft also is provided with a radially projecting elongated key 34 which is freely receivable in keyways 36 provided in the outer seat bracket 16' of the pair and in the back bracket 20'. The inner seat bracket 18' preferably is not provided with a similar keyway.

The inner portion of the shaft 32 projecting inward from the seat bracket 18' supports a coil spring 38 which abuts the bracket at one end and the hub 40 of a second hand knob 42 at the opposite end. Thus, the coil spring functions to urge the shaft 32 resiliently inward, to the position illustrated in FIG. 2.

The two shafts preferably are interconnected for simultaneous operation. In the embodiment illustrated this interconnection is provided by means of the threaded rods 44 and joining turnbuckle 46. This arrangement affords adjustment in the overall length of the connecting assembly to accommodate variations in spacings between the laterally spaced sets of pivot brackets.

Alternatively, the rods and turnbuckle assembly may be replaced by a length of flexible cord such as a cable or chain, which accommodates interconnection of spaced shafts which, by virtue of some seat designs, are not disposed in axial alignment.

In FIG. 2 of the drawings the seat back 14 is disposed in erect position. The keyways 30, 36 thus are in alignment and the coil spring 38 has surged the shafts 24, 32 inward so that the keys 28, 34 extend through the associated keyways and abut at their inner ends against the inner seat brackets 18, 18'. Accordingly, the seat back is securely locked in the erect position.

Figure 5:
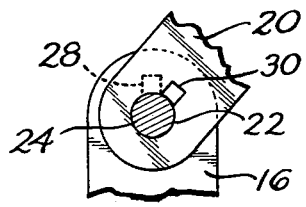
FIG. 5 is a fragmentary sectional view taken along the line 5—5 in FIG. 3.

When it is desired to release the seat back for forward tilting, for example to facilitate passenger entrance to or exit from the rear seat, the knob 26 or 42 is moved outward to the position illustrated in FIG. 3. Both shafts 24, 32 thus are moved outward, against the tension of the coil spring 38, until the keys 28, 34 have been retracted only from the keyways 30, 36 in the back brackets 20, 20'. The seat back then may be tilted forward as indicated in FIG. 5.

It is to be noted from FIG. 3 that when the keys 28, 34 are fully retracted from the keyways in the back brackets, the coil spring 38 is fully compressed, thereby providing a fixed abutment which prevents further retraction of the keys from the keyways in the outer seat brackets 16, 16'.

With the seat back tilted, the inner ends of the keys 28, 34 abut slidably against the adjacent surface of the back brackets 20, 20', under the force of the coil spring 38. Accordingly, when the seat back is again raised to erect position and the keyways in the back brackets 20, 20' become aligned with the keyways in the seat brackets 16, 16', the spring will pull the shafts 24, 32 inward automatically to lock the seat back in the erect position.

Although the foregoing structure is illustrated in association with the left hand seat back of an automobile, it will be apparent that the same structure also will accommodate the right hand seat back by simple inversion of the parts so that the hand knob 26 faces the right side of the seat. If it is desired that release be effected by pushing on a knob, rather than by pulling, the assembly may be mounted with the knob 42 facing the outer sides of the seats.

Although it is preferred to provide the locking keys and associated keyways for both shafts 24 and 32, for maximum security, it will be apparent that one of the conventional pivot bolts may be retained and that only the other conventional pivot bolt need be replaced by the locking shaft 42 and associated structure. If it is replaced by shaft 26 and associated structure, a spring is mounted on the inner end portion of the shaft and backed by a retainer, as will be apparent.

The hand knobs located between adjacent seat backs may be difficult to manipulate, and therefore they may be replaced by conventional backing retainers for the spring 38, if desired. The hand knobs also may be replaced by electrically actuated solenoids for moving the shafts.

The locking assembly is such that each shaft 24, 32 requires cooperation of only a pair of brackets, one (16 or 16') projecting from the seat and the other (20 or 20') projecting from the seat back. Thus, the brackets 18, 18' may be omitted, although they preferably are included for adding strength and providing better guiding of the shafts.

It will be evident from the foregoing that the safety lock of the present invention may be installed upon existing automobiles with a minimum of modification. The only requirements are that the existing pivot bolts be removed and that keyways 30, 36 be cut into the existing brackets 16, 20 and 16', 20' as previously described, to accommodate the keys 28, 34. The keys and keyways may take any non-circular form desired.

It will be apparent to those skilled in the art that various changes may be made in the details of construction described hereinbefore without departing from the spirit of this invention and the scope of the appended claims.

Having now described my invention and the manner in which it may be used, what I claim as new and desire to secure by Letters Patent is:

1. In a seat assembly including a seat, a seat back, and spaced pairs of pivot brackets on the seat and seat back, one bracket of each pair being mounted on the seat and the other bracket of each pair being mounted on the seat back, and each pair of pivot brackets having aligned pivot openings therein adapted to receive a pivot shaft forming the axis of pivotal movement of the seat back relative to the seat: the combination therewith of a safety lock for the seat back, comprising a pivot shaft extending slidably through the pivot openings of at least one of said pairs of pivot brackets, a locking key on said shaft, said pair of pivot brackets having key openings therein arranged for mutual alignment when the seat back is in erect position, the key openings being proportioned to freely receive the key therein and the key being proportioned to extend into both of said openings when aligned, resilient means engaging the shaft and urging the key toward locking position extending into both of said key openings, and operator means on the shaft for moving the key to unlocking position removed from one of said key openings.

2. In a seat assembly including a seat, a seat back, and spaced pairs of pivot brackets on the seat and seat back, one bracket of each pair being mounted on the seat and the other bracket of each pair being mounted on the seat back, and each pair of pivot brackets having aligned pivot openings therein adapted to receive a pivot shaft forming the axis of pivotal movement of the seat back relative to the seat: the combination therewith of a safety lock for the seat back, comprising two pivot shafts each extending slidably through the pivot openings of one of said pairs of pivot brackets, a locking key on each shaft, each pair of pivot brackets having key openings therein arranged for mutual alignment when the seat back is in erect position, the key openings being proportioned to freely receive the associated key therein and the key being proportioned to extend into both of said openings when aligned, connector means interconnecting the shafts for simultaneous movement, resilient means engaging one of the shafts and urging the keys toward locking position extending into both of their associated key openings, and operator means on one of the shafts for moving the keys to unlocking position removed from one of their associated key openings.

3. The combination of claim 2 wherein the connector means comprises a longitudinally adjustable rod assembly.

4. In a seat assembly including a seat, a seat back, and spaced pairs of pivot brackets on the seat and seat back, one bracket of each pair being mounted on the seat and the other bracket of each pair being mounted on the seat back, and each pair of pivot brackets having aligned pivot openings therein adapted to receive a pivot shaft forming the axis of pivotal movement of the seat back relative to the seat: the combination therewith a safety lock for the seat back, comprising a pivot shaft extending slidably through the pivot openings of at least one of said pairs of pivot brackets for longitudinal adjustment between locking and unlocking positions, locking means on the pivot shaft and associated pivot brackets arranged for mutual engagement in the locking position of the pivot shaft to secure the seat back against pivotal movement relative to the seat and for mutual disengagement in the unlocking position of the pivot shaft to release the seat back for pivotal movement relative to the seat, and operator means on the shaft for moving the latter.

5. The combination of claim 4 wherein there is a pivot shaft and locking means associated with each pair of pivot brackets, and there is included connector means interconnecting the pivot shafts for simultaneous movement thereof between said locking and unlocking positions.

References Cited in the file of this patent

UNITED STATES PATENTS

| | | |
|---|---|---|
| 2,145,987 | Liptak | Feb. 7, 1939 |
| 2,431,263 | Lundgren | Nov. 18, 1947 |
| 2,815,796 | Lobanoff | Dec. 10, 1957 |